United States Patent [19]

Nelson et al.

[11] Patent Number: 5,656,774
[45] Date of Patent: Aug. 12, 1997

[54] APPARATUS AND METHOD FOR SENSING FLUID LEVEL

[75] Inventors: Steven D. Nelson, Bradenton; James R. Champion, Sarasota; James S. Leonard, Parrish, all of Fla.

[73] Assignee: Teleflex Incorporated, Plymouth Meeting, Pa.

[21] Appl. No.: 658,083

[22] Filed: Jun. 4, 1996

[51] Int. Cl.⁶ .................................................. G01F 23/00
[52] U.S. Cl. ............................................................ 73/290
[58] Field of Search ........................... 73/290 R, 290 V; 324/642, 644, 648

[56] References Cited

U.S. PATENT DOCUMENTS 3,812,422  5/1974  De Carolis .
3,832,900  9/1974  Ross .
3,995,212  11/1976  Ross .
4,359,902  11/1982  Lawless ............................. 73/290 R
5,457,394  10/1995  McEwan .
5,457,990  10/1995  Oswald et al. ..................... 73/290 R Primary Examiner—Ronald L. Bieger
Attorney, Agent, or Firm—Howard & Howard

[57] ABSTRACT

A method and apparatus (10) for sensing a surface level (24) of fluid (12) in a tank (14) having an electrically conducting pickup tube (20) extending through a wall (16) of the tank (14) and into the fluid (12) includes a time domain reflectometry circuit (40) connected to the tube (20) for generating an incident pulse (68) that travels down the tube (20) and a portion of which is reflected at the surface (24) as a reflected pulse (70, 72) which travels back along the tube (20) and is sensed by the circuit (40). The circuit (40) utilizes the elapsed time between the generation of the incident pulse (68) and the receipt of the reflected pulse to determine the position of the surface (24) relative to a reference point. The robe (20) forms a transmission line with one of a plate (48), an outer tube (110) and a return tube (130).

27 Claims, 4 Drawing Sheets

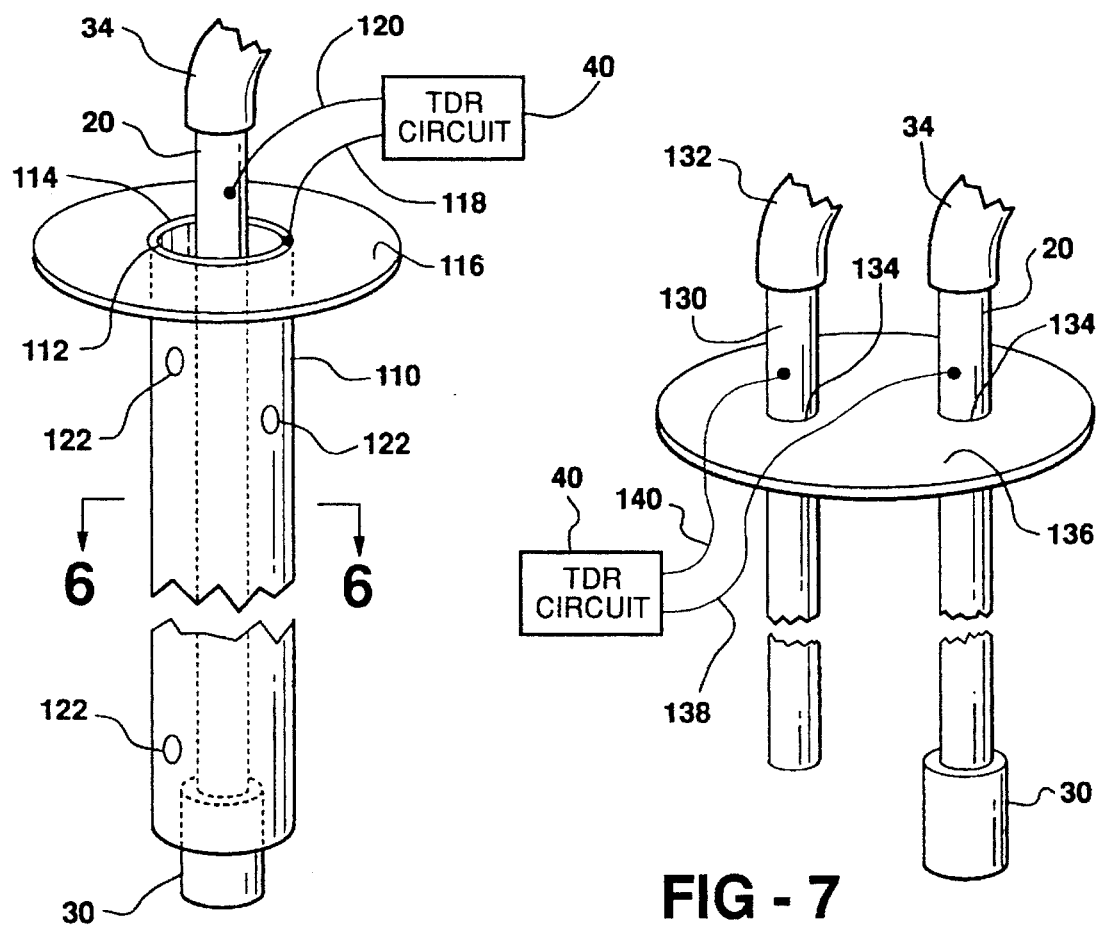
FIG - 5
FIG - 7
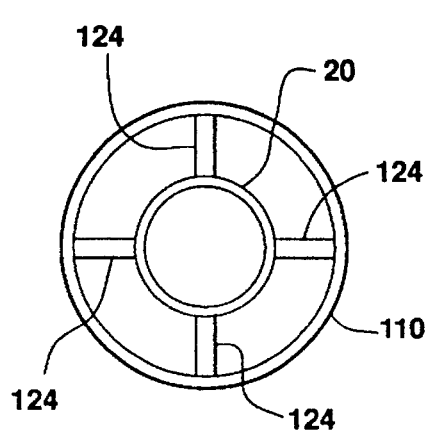
FIG - 6
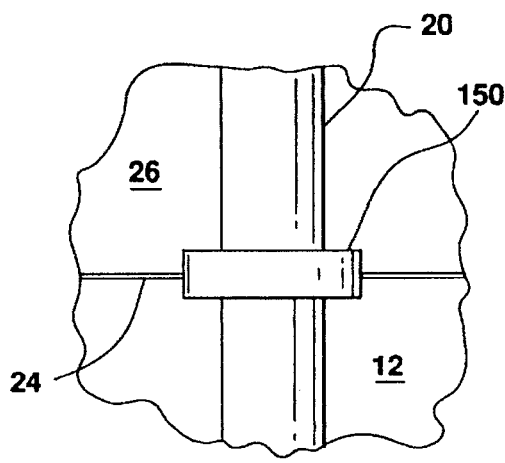
FIG - 8

APPARATUS AND METHOD FOR SENSING FLUID LEVEL

BACKGROUND OF THE INVENTION

The present invention relates to an apparatus and method for sensing fluid levels in a closed tank.

Various mechanical, electromechanical and sonic techniques have been employed to measure the level of liquid in a container or the interface levels between two or more liquids. The mechanical and electromechanical systems are relatively slow in reacting to changes in the level of the liquid, while systems employing sonic or ultrasonic transmissions become complex when used to measure the surface levels of contained liquids because of the echoes received from the surfaces forming the sides of the container.

Most prior art radiation reflection detection systems, while providing highly accurate indications of liquid level and responding in extremely short times to changes in the levels of the contained liquids, require very complex and expensive apparatus in order to function properly. One prior art system which attempts to minimize this complexity is shown in the U.S. Pat. No. 3,832,900. This system utilizes an open coaxial line which is immersed in the contained liquid, the contained liquid thereby filling the coaxial line. The liquid surface creates a discontinuity in the coaxial line which produces a reflection of the base band pulse signal that propagates back along the transmission line. The time at which this reflection is received, relative to the time of the transmitted pulse, determines the level of the liquid. However, the transmission line tends to clog and requires frequent cleaning.

Another apparatus for measuring the level and dielectric constant of liquid is shown in the U.S. Pat. No. 3,995,212. This device generates a subnanosecond base band pulse that propagates through a transition device to a single wire transmission line that extends through an air filled region into the liquid. The discontinuity created at the air-liquid interface produces a reflection of the base band pulse that is compared with the transmitted pulse with respect to time of arrival and amplitude to determine the liquid level and the reflection coefficient at the air liquid interface. The reflection coefficient is then utilized to determine the dielectric constant of the liquid.

Another fluid level sensor is shown in the U.S. Pat. No. 5,457,990 wherein a fuel level sensor includes a coaxial conductor probe that is positioned within a fuel tank at an angle relative to vertical and horizontal references. A repetitive electrical signal having a train of transients is transmitted from the upper end of the line and the line is monitored for reflections exceeding a threshold to generate an analysis window during which time the received reflected signals are analyzed to determine the level of the liquid in the tank.

The U.S. Pat. No. 3,812,422 discloses another time domain reflectometry fuel measuring device. This fuel measuring device requires a coaxial arrangement that has a grounding device between the inner and outer conductors. The grounding device is preferably in the form of a metallic plug at the bottom of the probe between the two conductors without which accurate measurements cannot be acquired.

A micropower impulse radar studfinder device utilizing time domain reflectometry is shown in the U.S. Pat. No. 5,457,394. Unmodulated pulses, approximately 200 ps wide, are emitted from a generator positioned on the surface of a wall. A large number of reflected pulses are sampled and averaged while background reflections are subtracted. Reflections from wall studs or other hidden objects are detected and displayed using light emitting diodes.

SUMMARY OF THE INVENTION

The apparatus according to the present invention senses a level of a fluid in a tank utilizing a fluid pickup tube. The apparatus for sensing includes a pulse means for generating an incident pulse and sensing a reflected pulse at an input/output thereof and having a sensing signal output, and an electrically conductive pickup tube means having a lower end and being connected to the pulse means input/output at a point adjacent an upper end spaced a predetermined distance from the lower end, the pickup tube being adapted for insertion into the tank with the lower end in a first fluid for drawing the first fluid from the tank through the pickup tube means. When the pickup tube means is inserted into the tank with the lower end in the first fluid and the pulse means generates the incident pulse, the incident pulse travels from the point along the pickup tube means to a surface of the first fluid at a boundary of a second fluid above the first fluid to generate the reflected pulse which travels back along the pickup tube means to the point. The pulse means is responsive to the generation of the incident pulse at the point and receipt of the reflected pulse at the point for determining an elapsed time between the generation and the receipt for generating a sensing signal at the sensing signal output, the sensing signal representing a distance between the surface of the first fluid and the point on the pickup tube means.

The pulse means includes an oscillator means for generating a plurality of pulses at an output and a pulse generator means having an input connected to the oscillator means output for generating at the pulse means input/output one of the incident pulses in response to each of said oscillator pulses. The pulse means also includes a sample gate means having an input connected to the pulse means input/output and an output for selectively passing the reflected pulse. The pulse means further includes the oscillator means and another oscillator means each having an output connected to a gate input of the sample gate means for generating a plurality of sample pulses at a first frequency phase modulated at a second frequency lower than the first frequency to turn the sample gate means on and off and selectively pass the reflected pulse.

In one embodiment, the apparatus includes a coaxial cable having a central conductor connected between the pulse means input/output and the point on the pickup tube means and the pulse means compensates for a travel time of the incident pulse and the reflected pulse along the central conductor. Also included is a reflector base plate and mounting plate adapted to be attached to the tank and having an aperture formed therein through which the pickup tube means extends in non-contacting relationship with the point adjacent the plate. The apparatus can include a reserve end attached to the lower end of the pickup tube means for drawing the fluid in the tank below the lower end into the pickup tube means.

In another embodiment, the apparatus includes an outer tube means surrounding the pickup tube means for returning to the tank at least a portion of the fluid drawn from the tank. A first lead is connected between the pulse means input/output and the point on the pickup tube means and a second lead is connected between the pulse means input/output and the outer tube whereby the pickup tube means and the outer tube function as a coaxial transmission line for the incident pulse.

In yet another embodiment, the apparatus includes a return tube adapted for insertion into the tank adjacent the pickup tube means for returning to the tank at least a portion of the fluid drawn from the tank. The apparatus also includes a first lead connected between the pulse means input/output and the point on the pickup tube means and a second lead connected between the pulse means input/output and said return tube whereby the pickup tube means and the return tube function as a parallel pair transmission line for the incident pulse.

The apparatus can include a float slidably mounted on the pickup tube means for floating at the surface of the fluid in the tank and for generating the reflected pulse with at least a predetermined magnitude. The apparatus also can include a liquid level gauge means connected to the sensing signal output and responsive to the sensing signal for indicating the level of the fluid in the tank and a low liquid warning means connected to the sensing signal output and responsive to the sensing signal for indicating a low level of the fluid in the tank.

The method of sensing a level of a fluid in a tank according to the present invention includes the steps of: inserting an electrically conducting pickup tube into the tank with a lower end of the pickup tube positioned at a lowest fluid level to be sensed; generating an incident pulse at a predetermined point and applying the incident pulse to the pickup tube, the incident pulse travelling toward the pickup tube lower end and generating a reflected pulse at a surface level of the fluid; sensing the reflected pulse at the point; determining an elapsed time between generation of the incident pulse at the point and receipt of the reflected pulse at the point; and indicating an amount of the fluid in the tank based upon the elapsed time.

It is an object of the present invention to reduce the cost and complexity of systems for measuring the level of a fluid in a tank.

The present invention has the advantage of not requiring a separate probe for transmitting the incident pulse and the reflected pulse.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 is a perspective view of an alternate embodiment fluid level sensing apparatus in accordance with the present invention;

FIG. 6 is an enlarged cross-sectional view as if taken along the line 6—6 in the FIG. 5;

FIG. 7 is a perspective view of a second alternate embodiment fluid level sensing apparatus in accordance with the present invention; and FIG. 8 is a fragmentary view of the pickup tube shown in the FIG. 1 with a float mounted thereon.

DESCRIPTION OF THE PREFERRED EMBODIMENT

The present invention concerns the use of time domain reflectometry (TDR) to measure fluid levels in a closed tank.

Time domain reflectometry measures the pulse-echo interval of a short electrical pulse propagating from a pulse source along a conductor to a break and back to the pulse source where a pulse receiver is located. The measured interval "T" between generation and reception is scaled by the speed of light "C" and the square root of the relative dielectrical constant "$\epsilon_r$" of the material surrounding the conductor to determine the distance "D" to the break, or $D=(\epsilon_r)^{0.5}CT$. The conductor can be an electrical transmission line that is inserted into fluids and the gas/liquid or liquid/liquid boundary becomes the "break" or discontinuity that reflects the pulse. The time difference between a pulse generated and a reflection received at the start of the line from the boundary can be used to determine the distance along the line and consequently the fluid level which creates the boundary. When the line is inserted into a liquid, the strength of the reflected pulses scale with the dielectric constants at the gas/liquid boundary in subsurface liquid/liquid boundaries. When the liquid has a low relative dielectric constant, such as JP-3 jet fuel ($\epsilon_r=2.08$), only a portion of the pulse is reflected at the gas/liquid boundary and the remaining portion continues into the liquid until another discontinuity is reached, such as an oil/water boundary ($\epsilon_r=79$ for water), or the tank bottom itself ($\epsilon_r=\infty$ for metal). Thus, the line can measure fuel fill level while providing additional information about conditions within the tank.

The pulses traveling down the line are reflected at the precise gas/liquid or liquid/liquid boundary regardless of the dielectric constants involved. The dielectric constants affect the amplitude of the reflected pulses, but not their position and time. Pulse amplitude variations may introduce measurement errors, but these errors can be trimmed out in the associated electronics since the dielectric constant of the liquid in a tank is generally known.

Figure 1:
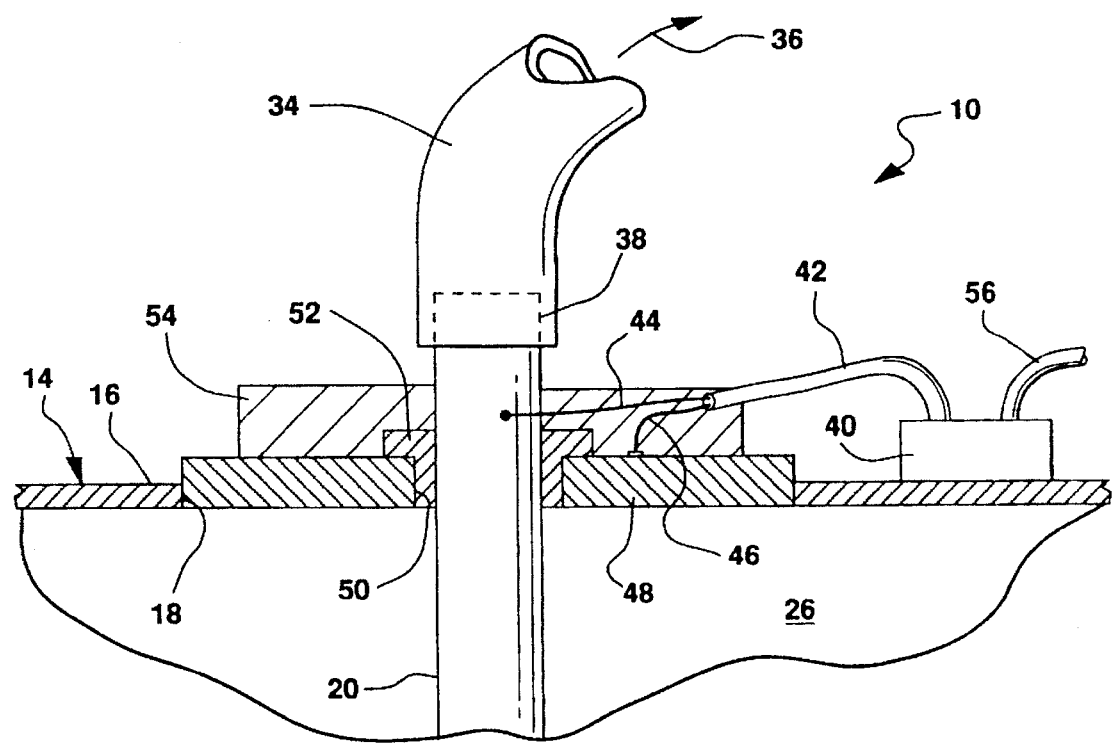
FIG. 1 is a fragmentary cross sectional view of a liquid storage tank including a fluid level sensing apparatus in accordance with the present invention.
Figure 1:
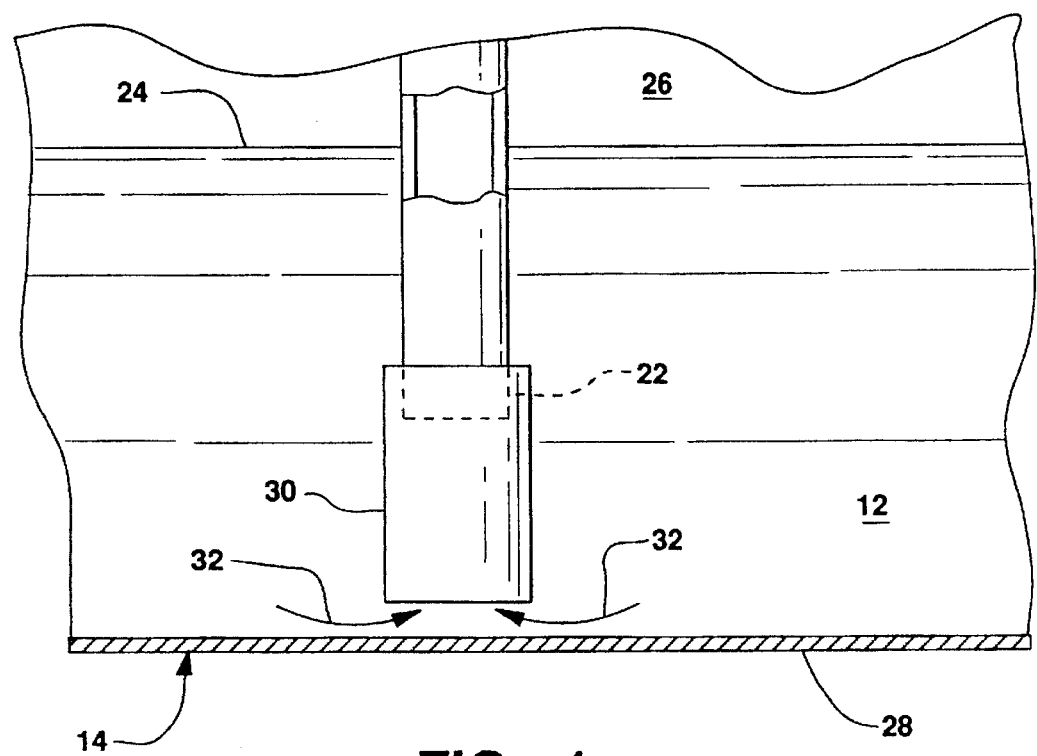

There is shown in the FIG. 1 a fluid level sensing assembly 10 in accordance with the present invention for measuring a level of liquid 12 inside a tank 14. The tank 14 includes an upper wall 16 having an aperture 18 formed therein through which a liquid pickup tube 20 extends. A lower end 22 of the tube 20 extends below a surface level 24 of the liquid 12 which level defines a boundary between the liquid and a gas 26, such as air, filling an upper portion of the tank 14. The lower end 22 terminates above a lower wall 28 of the tank 14. A reserve end 30, in the form of a piece of plastic tubing, is attached to the lower end 22 of the tube 20 to form an inlet for receiving the liquid 12 in the direction of an arrow 32. Although shown as a generally straight tube, the reserve end 30 can be any desired shape such as a generally L-shape with a leg extending generally parallel to the lower wall 28. The liquid 12 is drawn through the plastic tubing 30 and through the tube 20 and exits the tank 14 through a pickup line 34 as shown by an arrow 36. The line is connected between an upper end 38 of the tube 20 and a suction device (not shown) such as a pump for drawing the liquid from the tank 14. Although the present invention has many applications, the tank 14 can be, for example, a fuel tank of a vehicle and the liquid 12 can be a fuel such as gasoline.

The fluid level sensing assembly 10 includes a time domain reflectometry (TDR) circuit 40 mounted on an outer surface of the upper wall 16. A length of coaxial cable 42 has one end connected to an input/output of the circuit 40 and an opposite end which terminates adjacent the upper end 38 of the pickup tube 20. The tube 20 is formed of an electrically conductive material, or has an electrically conductive coating on an exterior surface thereof. A center conductor 44 of the coaxial cable 42 is electrically attached to the exterior surface of the pickup tube 20. A shield 46 of the coaxial cable 42 is electrically connected to a combination reflector base plate and mounting plate 48 which is mounted in the aperture 18 formed in the upper wall 16 of the tank 14. The plate 48 has an aperture 50 formed therein through which the tube 20 extends without contacting the plate. The space between the outside surface of the tube 20 and the wall of the aperture 50 is closed by a flanged seal 52 mounted on an upper surface of the plate 48. A cover 54 encloses the seal 52 and the end of the coaxial cable 42 adjacent the tube 20. A sensor signal cable 56 has one end connected to the TDR circuit 40 and an opposite end connected to a liquid level gauge (shown in FIG. 2). Although shown spaced from the tube 20, the TDR circuit 40 could be mounted under the cover 54 and the cable 42 could then be eliminated. Also, if the upper wall 16 of the tank 14 is formed of a suitable metal material, the plate 48 can be eliminated and the aperture 18 reduced to the size of the aperture 50.

Figure 2:
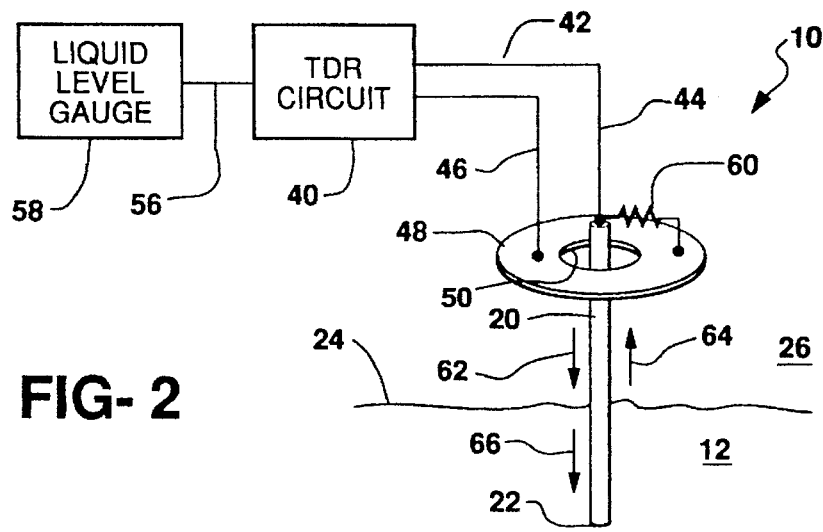
FIG. 2 is schematic diagram of the fluid level sensing apparatus shown in the FIG. 1.

There is shown in the FIG. 2 a schematic diagram of the fluid level sensing assembly 10. A liquid level gauge 58 is connected to an output of the TDR circuit 40 by the sensor signal cable 56. The central conductor 44 of the coaxial cable 42 is connected between the TDR circuit 40 and the pickup tube 20. The end of the central conductor 44 also can be connected through an impedance mismatch 60 to the plate 48. The shield 46 of the coaxial cable 44 is connected to the plate 48 to complete the electrical circuit. The lower end 22 of the pickup tube 20 extends through the air 26 and below the surface level 24 of the liquid 12.

In operation, the TDR circuit 40 generates an ultra-short pulse along the central conductor 44. This pulse must be applied to a probe which is some form of transmission line having a characteristic impedance and is inserted in two fluids which have different dielectric impedances such that a boundary is formed which reflects the pulse. The pickup tube 20 and the plate 48 form a type of Gaobau transmission line, or "G-line". The pulse travels down the exterior surface of the tube 20 in the direction of an arrow 62 which pulse is known as the incident pulse having a voltage magnitude $V_i$. At the surface level 24 of the liquid 12, the incident pulse encounters a boundary between air 26 above and liquid 12 below the level 24. This boundary causes a portion of the incident pulse to be reflected back up the tube 20 in the direction of an arrow 64 as a reflected pulse having a voltage magnitude $V_r$. The remaining portion of the incident pulse travels through the liquid 12 toward the lower end 22 of the tube 20 in the direction of an arrow 66 as a forward scattered pulse having a voltage magnitude $V_f$.

Figure 3A:
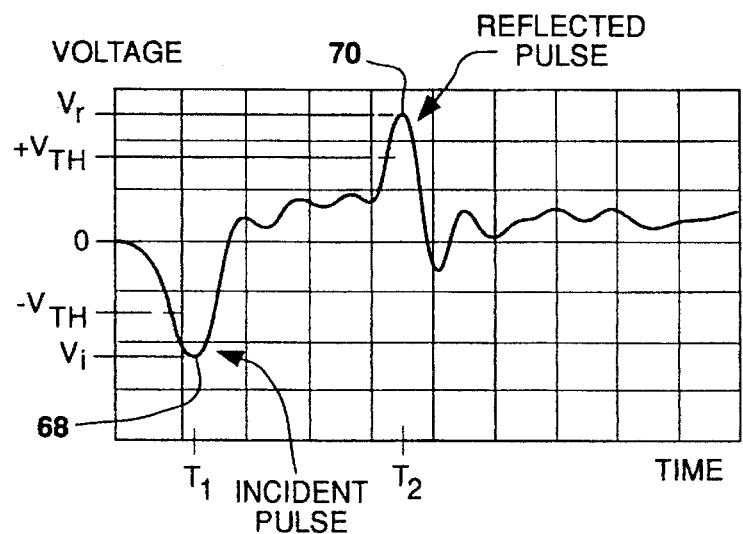
FIGS. 3a and 3b are waveform diagrams of the level sensing signals generated by the fluid level sensing apparatus shown in the FIG. 2.
Figure 3B:
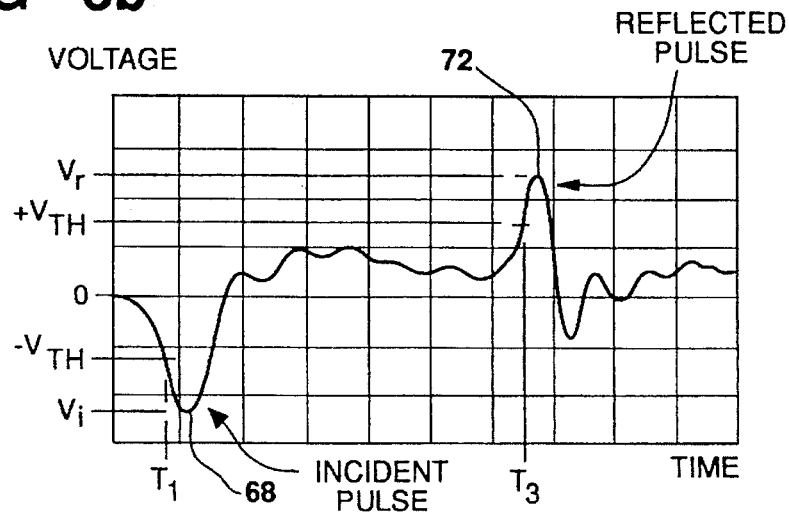

There is shown in the FIG. 3a a signal magnitude voltage versus time waveform diagram of the incident pulse and reflected pulse signals generated from and back to the TDR circuit 40. An incident pulse 68 is generated with the incident pulse voltage magnitude $V_i$ at the plate 48 at an incident pulse generation time $T_1$. The incident pulse 68 travels down the tube 20, but the plate 48 also generates a reflection as a fiducial pulse to the TDR circuit 40. Thus, the fiducial pulse generated at the time $T_1$ can be used by the TDR circuit 40 as a reference to determine the elapsed time to receipt of a reflected pulse. If the liquid surface 24 is relatively high in the tank 14, a first reflected pulse 70 arrives at the plate 48 at a time $T_2$. The difference between the generation time $T_1$ and the arrival time $T_2$ permits the calculation of the distance from the base plate 48 to the surface level 24. Use of this time difference eliminates timing errors and drift in the coaxial cable 42 and the TDR circuit 40. There is shown in the FIG. 3b a second reflected pulse 72 at a time $T_3$ representing an arrival time for a reflected pulse from a relatively low liquid level such that the difference between the time $T_1$ and the time $T_3$ can be used to calculate the distance from the base plate 48 to the surface level 24. The base plate 48 must have no lateral dimension smaller than the width of the incident pulse times the speed of light "C" divided by two.

Figure 4:
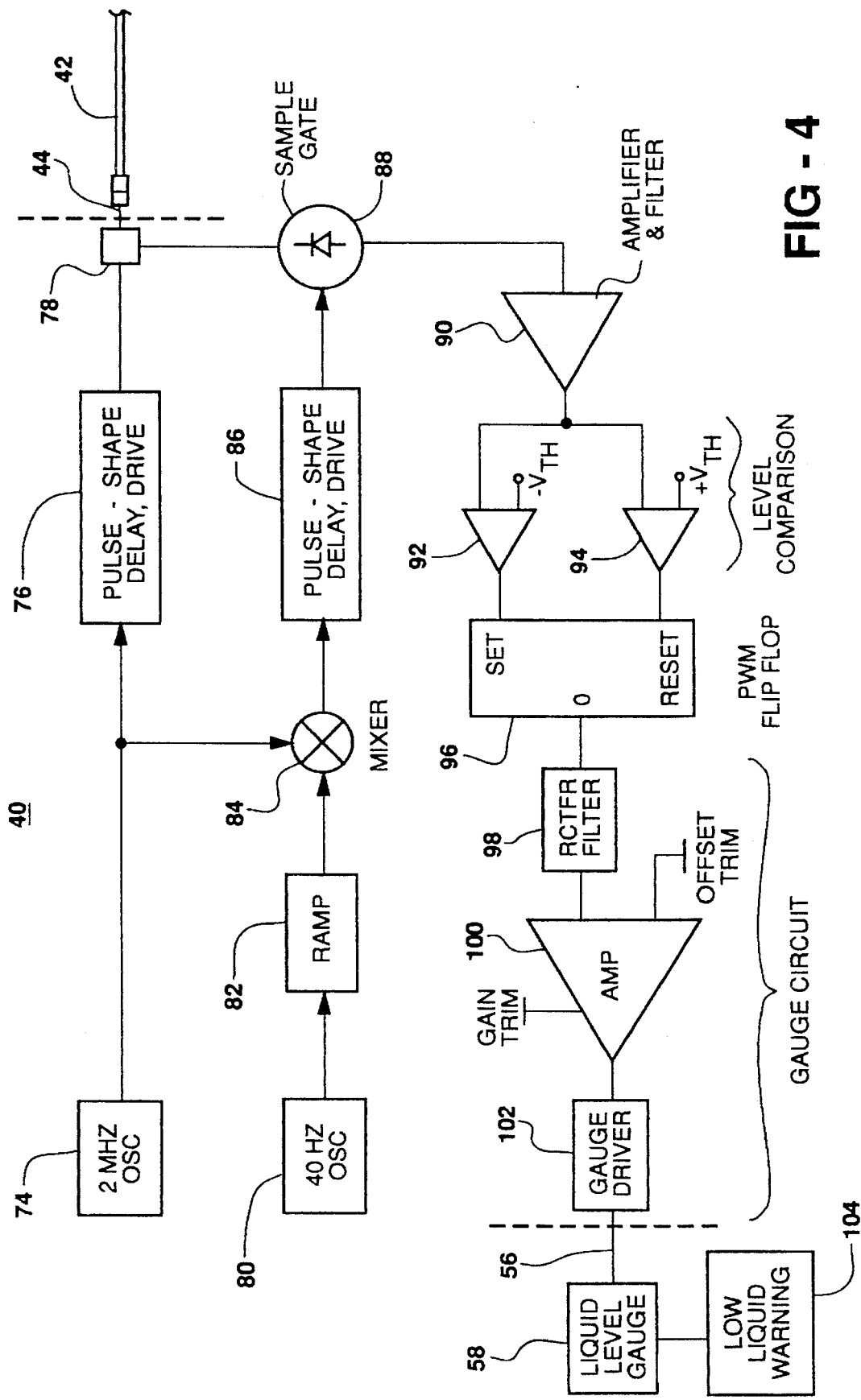
FIG. 4 is a schematic block diagram of the time domain reflectometry circuit shown in the FIG. 2.

There is shown in the FIG. 4 a schematic block diagram of the TDR circuit 40. A first oscillator 74 generates a pulse train at an approximately two MHz rate at an output connected to an input of a first pulse generator 76. Although a two Mhz oscillator is described, any frequency in a wide range of lower and higher frequencies can be used and may be based upon any one of a number of commercially available oscillator circuits. The pulse generator 76 has an output connected to a first input of an impedance matching network 78. The pulse generator 76 shapes and delays the input pulses and generates ultra-short drive pulses as the incident pulses 68 on the central conductor 44 which is connected to an output of the impedance matching network 78 which functions as an input/output for the TDR circuit 40. In the case where the cable 42 can be eliminated by locating the TDR circuit 40 adjacent the tube 20, the network 78 includes a directional sampler which separates a reflected pulse from an incidence pulse that has not terminated before the reflected pulse is received. The first oscillator 74 and the first pulse generator 76 comprise a pulse means for generating the incident pulses the width of which will depend upon the length of the tube 20 between the lower end 22 and the plate 48 and the desired percentage of length resolution. For example, a 200 ps wide pulse generated at the two MHz pulse rate provides a resolution of approximately 0.0005".

The remainder of the TDR circuit 40 comprises a sensing means for determining and generating an indication of the liquid level 24. A second oscillator 80 generates a pulse train at a forty Hz rate at an output connected to an input of a ramp generator 82. Although a forty Hz oscillator is described, any frequency in a wide range of lower and higher frequencies can be used and may be based upon any one of a number of commercially available oscillator circuits. The ramp generator 82 generates a ramp signal at the repetition rate of the second pulse generator 80 to an input of a mixing or summing circuit 84 which has another input connected to the output of the first oscillator 74 for generating a signal at an output. The output of the mixing circuit 84 is connected to an input of a second pulse generator 86 which has an output connected to a gate input of a sample gate 88. The sample gate 88 has an input connected to the central conductor 44 through the network 78 and an output connected to an input of an amplifier and filter circuit 90. The sample gate 88 is gated on and off by gate pulses generated by the second pulse generator 86 with a variable or semi-random delay to switch from hold to sample and back to hold. The timing of the gate pulses is a two MHz signal that has been phase modulated such that the reflected signal is sampled for at times representing possible reflections over the full length of the tube 20.

An output of the amplifier and filter circuit 90 is connected to a first input of each of a pair of comparator circuits 92 and 94. The voltage appearing at this output of the circuit 90 is an equivalent time replica (millisecond time scale) of the real time reflected pulses (nanosecond time scale) at the input to the gate 88. The comparator circuit 96 has a second input connected to a source (not shown) of a negative threshold voltage $-V_{TH}$ and the comparator circuit 94 has a second input connected to a source (not shown) of a positive threshold voltage $+V_{TH}$. An output of the comparator circuit 92 is connected to a set input of a flip flop 96. An output of the comparator circuit 94 is connected to a reset input of the flip flop 96. A Q output of the flip flop 96 is connected to an input of a rectifier and filter circuit 98. With reference to the FIG. 3a, when the magnitude of the incident pulse 68 exceeds the negative threshold voltage $-V_{TH}$, the flip flop 96 is set and when the magnitude of the reflected pulse 70 exceeds the positive threshold voltage $+V_{TH}$, the flip flop is reset. Thus, the output signal from the flip flop 96 is pulse width modulated with the pulse width representing the distance between the plate 48 and the air/liquid boundary at the liquid level 24.

The rectifier and filter circuit 98 has an output connected to an input of an amplifier 100 which has another input connected to a source of an offset trim voltage source (not shown). An output of the amplifier 100 is connected to a gauge driver circuit 102 which has an output connected to the sensor signal cable 56 for generating a sensing signal to the liquid level gauge 58. The gauge 58 responds to the sensing signal by displaying an indication related to the level 24 of the liquid 12 in the tank 14, typically an indication of the amount of the liquid in the tank. The gauge 58 can be analog or digital.

As stated above, the reserve end 30 is formed of a plastic material. Thus, the incident pulse 68 only travels to the lower end 22 of the tube 20 and cannot generate a sensing signal for a liquid level below the lower end of the tube. The reserve end 30 permits the continued drawing of liquid when the liquid level 24 is below the end 22. Therefore, a sensing signal corresponding to the lower end 22 can be used by the liquid level gauge 58 to generate a low liquid warning signal at an output connected to an input of a low liquid warning indicator 104. When used in a vehicle, for example, the indicator 104 warns the driver of a low fuel situation while the reserve end 30 permits the use of a fuel reserve in the lower portion of the tank 14 below the lower end 22 of the tube 20. However, the reserve end 30 could be formed of a metal material, or even be formed integral with the pickup tube 20, by modifying the TDR circuit 40 to generate the low level warning signal at a liquid level corresponding to the lower end 22.

There is shown in the FIG. 5 and the FIG. 6 an alternate embodiment of the fluid level sensing assembly in accordance with the present invention. The pickup tube 20 is connected at the lower end to the reserve end 30 and at the upper end to the pickup line 34. The pickup tube 20 extends through an outer tube 110 having an upper end 112 positioned in an aperture 114 formed in a reflector base plate and mounting plate 116 similar to the plate 48. The upper end 112 is attached to the plate 116 and is electrically connected by a lead 118 to the TDR circuit 40. Another lead 120 is connected between the pickup tube 20 and the TDR circuit 40. A plurality of holes 122 can be formed in the wall of the outer tube 110 to permit gas trapped between the outer tube and the pickup tube 20 to escape and reduce false measurements due to liquid between the tubes splashing or sloshing. As shown in the FIG. 6, the tubes 20 and 110 can be maintained in desired relative positions by a plurality of spacers 124 connected between an outer surface of the pickup tube 20 and an inner surface of the outer tube 110. The tubes 20 and 110 form a coaxial transmission line type of probe.

There is shown in the FIG. 7 a second alternate embodiment of the fluid level sensing assembly in accordance with the present invention. The pickup tube 20 is connected at the lower end to the reserve end 30 and at the upper end to the pickup line 34. A return tube 130, similar to the pickup tube 20 but utilized to return liquid to a tank, has an upper end connected to a return line 132. Each of the tubes 20 and 130 extend through apertures 134 formed in a reflector base plate and mounting plate 136 similar to the plate 48. The pickup tube 20 is electrically connected by a lead 138 to the TDR circuit 40. Another lead 140 is connected between the return tube 130 and the TDR circuit 40. The tubes 20 and 130 form a balanced or parallel pair transmission line type of probe.

In the case where the fluid 12 being measured has a dielectric constant that does not create a significant enough change in the impedance of the tube 20 so that there is little reflection, there is shown in the FIG. 8 an optional float 150 in accordance with the present invention. The float 150 is slidably mounted on the pickup tube 20 and has a density such that it floats at the surface level 24. The float 150 is formed of a material which creates a relatively large dielectric difference thereby generating the reflected signal with at least a predetermined magnitude sufficient to be detected by the TDR circuit 40.

In summary, an apparatus for sensing a level of a fluid (12) in a tank (14) in accordance with the present invention includes: a pulse means (40) for generating an incident pulse (68) and sensing a reflected pulse (70, 72) at an input/output (78) thereof and having a sensing signal output (102); and an electrically conductive pickup tube means (20) having a lower end (22) and being connected to the pulse means input/output (78) at a point adjacent an upper end (38) spaced a predetermined distance from the lower end (22), the pickup tube (20) being adapted for insertion into the tank (14) with the lower end (22) in a first fluid (12) for drawing the first fluid (12) from the tank (14) through the pickup tube means (20) whereby when the pickup tube means (20) is inserted into the tank (14) with the lower end (22) in the first fluid (12) and the pulse means (40) generates the incident pulse (68), the incident pulse (68) travels from the point along the pickup tube means (20) to a surface (24) of the first fluid (12) at a boundary of a second fluid (26) above the first fluid (12) to generate the reflected pulse (70, 72) which travels back along the pickup tube means (20) to the point, and the pulse means (40) is responsive to the generation of the incident pulse (68) at the point and receipt of the reflected pulse (70, 72) at the point for determining an elapsed time between the generation and the receipt for generating a sensing signal at the sensing signal output (102), the sensing signal representing a distance between the surface (24) of the first fluid (12) and the point on the pickup tube means (20). The method of sensing a level (24) of a fluid (12) in a tank (14) according to the present invention includes the steps of: a) inserting an electrically conducting pickup tube (20) into a tank (14) with a lower end (22) of the pickup tube (20) positioned at a lowest fluid level to be sensed; b) generating an incident pulse (68) at a predetermined point (78) and applying the incident pulse (68) to the pickup tube (20), the incident pulse (68) travelling toward the pickup tube lower end (22) and generating a reflected pulse (70, 72) at a surface level (24) of the fluid (12); c) sensing the reflected pulse (70, 72) at the point (78); d) determining an elapsed time between generation of the incident pulse (68) at the point (78) and receipt of the reflected pulse (70, 72) at the point (78); and e) indicating an mount of the fluid (12) in the tank (14) based upon the elapsed time.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for sensing a level of a fluid (12) in a tank (14) comprising:

a pulse means (40) for generating an incident pulse (68) and sensing a reflected pulse (70, 72) at an input/output (78) thereof and having a sensing signal output (102); and an electrically conductive pickup tube means (20) having a lower end (22) and being connected to said pulse means input/output (78) at a point adjacent an upper end (38) spaced a predetermined distance from said lower end (22), said pickup tube means (20) being adapted for insertion into a tank (14) with said lower end (22) in a first fluid (12) for drawing the first fluid (12) from the tank (14) through said pickup tube means (20) whereby when said pickup tube means (20) is inserted into the tank (14) with said lower end (22) in the first fluid (12) and said pulse means (40) generates said incident pulse (68), said incident pulse (68) travels from said point along said pickup tube means (20) to a surface (24) of the first fluid (12) at a boundary of a second fluid (26) above the first fluid (12) to generate said reflected pulse (70, 72) which travels back along said pickup tube means (20) to said point, and said pulse means (40) is responsive to said generation of said incident pulse (68) at said point and receipt of said reflected pulse (70, 72) at said point for determining an elapsed time between said generation and said receipt for generating a sensing signal at said sensing signal output (102), said sensing signal representing a distance between the surface (24) of the first fluid (12) and said point on said pickup tube means (20).

2. The apparatus according to claim 1 wherein said pulse means (40) repetitively generates said incident pulse (68) at a pulse rate of approximately two MHz.

3. The apparatus according to claim 1 wherein said pulse means (40) includes an oscillator means (74) for generating a plurality of pulses at an output and a pulse generator means (76) having an input connected to said oscillator means output for generating at said pulse means input/output (78) one of said incident pulses (68) in response to each of said oscillator pulses.

4. The apparatus according to claim 1 wherein said pulse means (40) includes a sample gate means (88) having an input connected to said pulse means input/output (78) and an output for selectively passing said reflected pulse (70, 72).

5. The apparatus according to claim 4 wherein said pulse means (40) includes an oscillator means (74, 80) having an output connected to a gate input of said sample gate means (88) for generating a plurality of sample pulses at a first frequency phase modulated at a second frequency lower than said first frequency to turn said sample gate means (88) on and off and selectively pass said reflected pulse (70, 72).

6. The apparatus according to claim 5 wherein said first frequency is approximately two MHz and said second frequency is approximately forty Hz.

7. The apparatus according to claim 1 wherein said pulse means (40) includes a first oscillator means (74) for generating a plurality of pulses at a first frequency at an output, a first pulse generator means (76) having an input connected to said first oscillator output for generating at said pulse means input/output (78) one of said incident pulses (68) in response to each of said oscillator pulses, a sample gate means (88) connected between said pulse means input/output (78) and said sensing signal output (102), a second oscillator means (80) for generating a plurality of pulses at a second frequency at an output, a ramp circuit means (82) having an input connected to said second oscillator output for generating a ramp signal at an output in response to each one of said second oscillator pulses, a mixing circuit means (84) having a first input connected to said first oscillator output and a second input connected to said ramp circuit output and being responsive to said first oscillator pulses and said ramp signal for generating a signal at an output, and a second pulse generator means (86) having an input connected to said mixing circuit output and an output connected to a gate input of said sample gate means (88) for generating gate pulses in response to said mixing circuit output signal to switch said sample gate means (88) between sample and hold conditions.

8. The apparatus according to claim 1 including a coaxial cable (42) having a central conductor (44) connected between said pulse means input/output (78) and said point on said pickup tube means (20) and said pulse means (40) compensates for a travel time of said incident pulse (68) and said reflected pulse (70, 72) along said central conductor (44).

9. The apparatus according to claim 1 including a reflector base plate and mounting plate (48, 116, 136) adapted to be attached to the tank (14) and having an aperture (50, 114, 134) formed therein through which said pickup tube means (20) extends in non-contacting relationship with said point adjacent said plate (48, 116, 136).

10. The apparatus according to claim 1 including a reserve end (30) attached to said lower end (22) of said pickup tube means (20) for drawing the first fluid (12) in the tank (14) below said lower end (22) into said pickup tube means (20).

11. The apparatus according to claim 10 wherein said reserve end (30) is formed of an electrically non-conducting material.

12. The apparatus according to claim 1 including a liquid level gauge means (58) connected to said sensing signal output (102) and responsive to said sensing signal for indicating the level (24) of the first fluid (12) in the tank (14).

13. The apparatus according to claim 1 including a low liquid warning means (104) connected to said sensing signal output (102) and responsive to said sensing signal for indicating a low level of the first fluid (12) in the tank (14).

14. The apparatus according to claim 1 including an outer tube means (110) surrounding said pickup tube means (20) for returning to the tank (14) at least a portion of the first fluid (12) drawn from the tank (14).

15. The apparatus according to claim 14 including a first lead (120) connected between said pulse means input/output (78) and said point on said pickup tube means (20) and a second lead (118) connected between said pulse means input/output (78) and said outer tube (110) whereby said pickup tube means (20) and said outer tube (110) function as a coaxial transmission line for said incident pulse (68).

16. The apparatus according to claim 1 including a return tube (130) adapted for insertion into the tank (14) adjacent said pickup tube means (20) for returning to the tank (14) at least a portion of the first fluid (12) drawn from the tank (14).

17. The apparatus according to claim 16 including a first lead (138) connected between said pulse means input/output (78) and said point on said pickup tube means (20) and a second lead (140) connected between said pulse means input/output (78) and said return tube (130) whereby said pickup tube means (20) and said return tube (130) function as a parallel pair transmission line for said incident pulse (68).

18. The apparatus according to claim 1 including a float (150) slidably mounted on said pickup tube means (20) for floating at the surface (24) of the first liquid in the tank (14)

and for generating said reflected pulse (70, 72) with at least a predetermined magnitude.

19. An apparatus for sensing a level of a fluid (12) in a tank (14) having an electrically conductive pickup tube (20) for drawing the fluid (12) from the tank (14) extending through a wall (16) of the tank (14) into the fluid (12) comprising:

a pulse means (40) for generating an incident pulse (68) and sensing a reflected pulse (70, 72) at an input/output (78) thereof;

a pulse transmission means (48, 110, 130);

a first conductor (44, 118, 138) having one end connected to said pulse means input/output (78) and an opposite end adapted to be connected to an electrically conductive pickup tube (20); and a second conductor (46, 120, 140) having one connected to said pulse means input/output (78) and an opposite end connected to said pulse transmission means (48, 110, 130) whereby when said opposite end of said first conductor (44, 118, 138) is connected to a point spaced a predetermined distance from a lower end (22) of an electrically conductive pickup tube (20) and the lower end (22) of the pickup tube (20) extends through a wall (16) of a tank (14) into a fluid (12) in the tank (14), said pickup tube (20) and said pulse transmission means (48, 110, 130) function as a transmission line for said incident pulse (68) which travels from the point along the pickup tube (20) to a surface level (24) of the fluid (12) to generate said reflected pulse (70, 72), an elapsed time between generation of said incident pulse (68) and receipt of said reflected pulse (70, 72) being proportional to a distance between the point and the surface level (24) of the fluid (12) in the tank (14).

20. The apparatus according to claim 19 wherein said pulse means (40) includes an oscillator means (74, 76) for generating a plurality of said incident pulses (68) and being connected to said input/output (78) and a gate means (74, 80, 82, 84, 86, 88) connected to said input/output (78) for selectively sampling for said reflected pulse (70, 72) associated with each said incident pulse (68).

21. The apparatus according to claim 20 wherein said oscillator means (74, 76) generates said incident pulses (68) at a first frequency and said gate means (74, 80, 82, 84, 86, 88) samples at a rate which is said first frequency modulated by a second frequency lower than said first frequency.

22. The apparatus according to claim 20 wherein said pulse means (40) includes a sensing signal means (90, 92, 94, 96, 98, 100, 102) for generating a sensing signal in response to said reflected pulses (70, 72) and being connected to said gate means (74, 80, 82, 84, 86, 88), said sensing signal representing an amount of the fluid (12) in the tank (14).

23. A method of sensing a level (24) of a fluid (12) in a tank (14) comprising the steps of:

a. inserting an electrically conducting pickup tube (20) into a tank (14) with a lower end (22) of the pickup tube (20) positioned at a lowest fluid level to be sensed;

b. generating an incident pulse (68) at a predetermined point (78) and applying said incident pulse (68) to the pickup tube (20), said incident pulse (68) travelling toward the pickup tube lower end (22) and generating a reflected pulse (70, 72) at a surface level (24) of the fluid (12);

c. sensing said reflected pulse (70, 72) at the point (78);

d. determining an elapsed time between generation of said incident pulse (68) at the point (78) and receipt of said reflected pulse (70, 72) at the point (78); and e. indicating an amount of the fluid (12) in the tank (14) based upon said elapsed time.

24. The method according to claim 23 wherein the step a. includes inserting the pickup tube (20) through an aperture (50) formed in a reflector base and mounting plate (48) in a non-contacting relationship and positioning the point at the plate (48) and the step b. includes providing a first connection (44) between the pickup tube (20) and a pulse means (40) for generating said incident pulse (68) and providing a second connection (46) between the pulse means (40) and the plate (48).

25. The method according to claim 23 wherein the step a. includes surrounding the pickup tube (20) with an outer tube (110) and inserting the pickup tube (20) and the outer tube (110) through an aperture (114) formed in a plate (116) in a non-contacting relationship and positioning the point at the plate (116) and the step b. includes providing a first connection (120) between the pickup tube (20) and a pulse means (40) for generating said incident pulse (68) and providing a second connection (118) between the pulse means (40) and the outer tube (110).

26. The method according to claim 23 wherein the step a. includes inserting the pickup tube (20) and a return tube (130) through associated ones of a pair of apertures (134) formed in a plate (136) in a non-contacting relationship and positioning the point at the plate (136) and the step b. includes providing a first connection (138) between the pickup tube (20) and a pulse means (40) for generating said incident pulse (68) and providing a second connection (140) between the pulse means (40) and the return tube (130).

27. The method according to claim 23 wherein the step a. includes generating a train of said incident pulses (68) at a first predetermined frequency and the step c. includes sensing at a sample rate equal to said first predetermined frequency modulated by a second predetermined frequency less than said first predetermined frequency.

* * * * *